Feb. 4, 1941.   J. A. CURTIS   2,230,287
SPLIT REPAIR SLEEVE FOR PIPE LINES
Filed July 11, 1939   3 Sheets-Sheet 1

INVENTOR
John A. Curtis
BY
Louis Prevost Whitaker
ATTORNEY

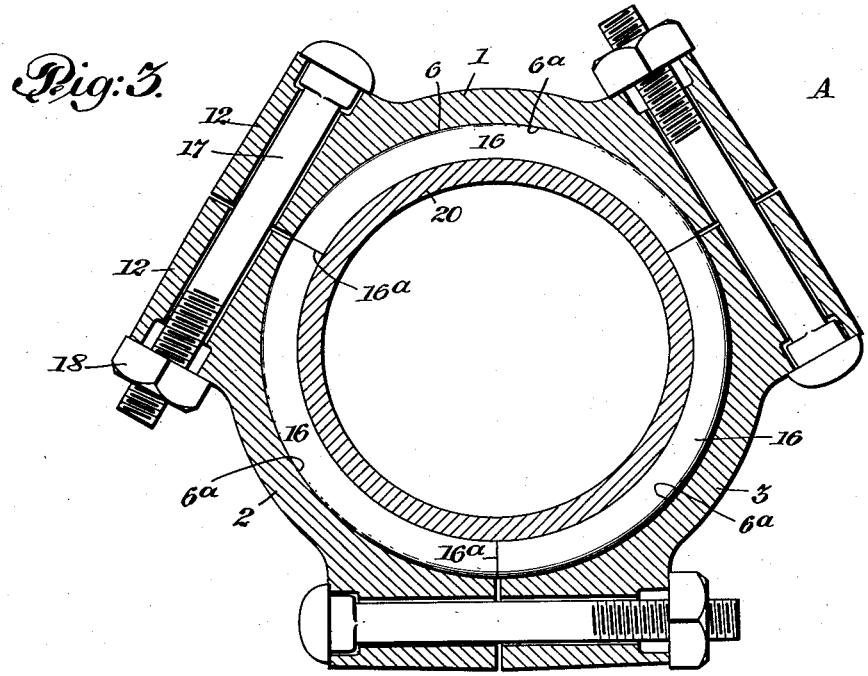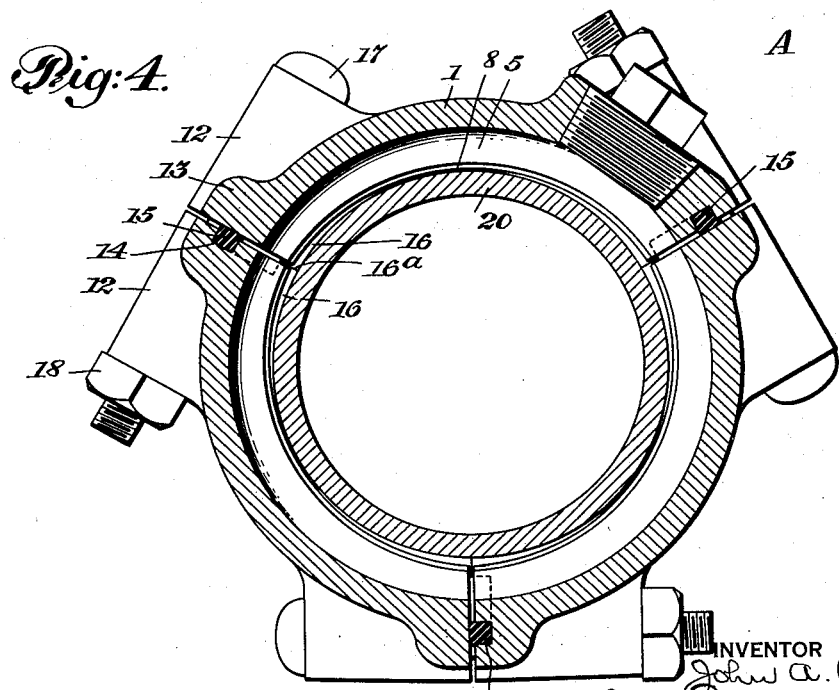

Feb. 4, 1941.  J. A. CURTIS  2,230,287

SPLIT REPAIR SLEEVE FOR PIPE LINES

Filed July 11, 1939   3 Sheets—Sheet 3

INVENTOR
John A. Curtis
BY Louis Prevost Whitaker
ATTORNEY

Patented Feb. 4, 1941

2,230,287

UNITED STATES PATENT OFFICE 2,230,287

SPLIT REPAIR SLEEVE FOR PIPE LINES

John A. Curtis, Bradford, Pa., assignor to Dresser Manufacturing Company, Bradford, Pa., a corporation of Pennsylvania Application July 11, 1939, Serial No. 283,762

7 Claims. (Cl. 138—99)

My invention consists in the novel features hereinafter described, reference being had to the accompanying drawings which illustrate one embodiment of the same, selected by me for purposes of illustration, and the said invention is fully disclosed in the following description and claims.

My invention consists in a split repair sleeve for pipe lines and has for its object the production of an efficient sleeve for this purpose, which is of the utmost simplicity of construction, can be manufactured at extremely low cost, and provides for extreme ease of assembly on the pipe lines to which it is applied.

Repair sleeves have usually been made of two segments provided with lateral flanges bolted together upon side packings and providing at each end an annular packing recess to receive an end gasket, which end gaskets are compressed by means of followers drawn toward the sleeve by means of bolts, usually through bolts, extending from one follower to another. It has been attempted to form split sleeves without the use of through bolts or other longitudinally disposed bolts and followers, and to depend upon the bolts which clamp the sections of the sleeve together to compress end packings into sealing engagement with the pipe or pipes as well as to compress the side packing. It is obviously difficult to satisfactorily compress circular end gaskets by drawing up bolts disposed tangentially to the pipe or pipes, and this is particularly true when it is necessary at the same time to compress side gaskets. The difficulties in making a satisfactory sleeve of this character are also increased by the great variations encountered in the pipes to which these sleeves are applied, especially cast iron pipe. It requires tremendous bolt torque to cause the end gaskets to not only fill the recesses in the sleeve body provided for them, but to come into sealing contact with the surface of the pipe along a plane at right angles to the axis of the bolts. By reason of the great difficulties, it has therefore been practically impossible to make heretofore a split sleeve of this character, except for very small sizes of pipe, for example ¾" to 2" internal diameter (id).

I have found as a result of a considerable amount of experimentation and study that the difficulties with this type of split sleeve can be practically and satisfactorily overcome by means of the sleeve construction illustrated in the accompanying drawings and disclosed in this application. In accordance with my present invention, the sleeve body is formed in segments, and is provided adjacent to each end with an annular recess, substantially rectangular in cross section. The gaskets are likewise substantially rectangular in cross section and of a width somewhat greater in the direction of the axis of the pipe than the corresponding dimension of the end recesses, that is to say, between their lateral walls. The gaskets are also of slightly greater dimensions in a direction toward their centers than the depth of the recess in the sleeve segments. The gaskets will preferably be cut so that each segment thereof is slightly greater in length than the arc between the ends of the segments of the sleeve. Each segment of the gasket is then forced into its end groove under great pressure, by hydraulic means, or in any other preferred manner, thus causing the rubber to completely fill the recesses and remain under great internal stress therein, the inner surfaces of the gasket extending slightly beyond the lateral walls of the groove between which they are maintained under stress, and the ends of the gaskets extending slightly beyond the ends of the sleeve segments. The sleeve segments are shipped from the factory with the gasket inserted therein and under internal stress so that when the segments of the sleeve are assembled in association with the necessary side packings and are connected by suitable bolts and nuts, the strain of the bolts will not be taken up to any appreciable extent to place the body of the end packings in a condition of internal stress, since such condition already exists, and will be exerted almost entirely in securing a sealing engagement between the projecting inner portions of the gaskets and the exterior surface of the pipe or pipes.

My invention furthermore provides for overcoming practically and effectively the variations in the exterior diameter of the pipes to which these sleeves are applied. Obviously the amount of clearance between the exterior of the pipe and the interior of the portions of the sleeve on opposite sides of the packing is a matter of utmost importance. There must be some clearance so that in tightening the bolts, the segments of the sleeve will not be drawn into direct contact with the pipe, or in other words, become iron-bound, in which case further compression of the gasket at such points would cease. On the other hand, it is obvious that too great a clearance will make it difficult to secure a sealing engagement between the inner surfaces of the gaskets and the exterior of the pipe or pipes, and will also permit cold flow of the rubber gaskets to take place after the screws are drawn up, with a consequent lessening of the sealing effect.

According to my invention, the split sleeve is made of at least three segments and the inner surfaces of the portions on each side of the end grooves the surfaces forming the pipe aperture of the sleeve are formed as arcs having their centers located beyond the median axis of the sleeve from the respective segment. The curvature of the inner faces of each segment is thus non-coaxial with the median axis of the sleeve and non-coaxial with the inner faces of the other segments. When the three segments are assembled around the pipe, the amount of clearance at different portions of the segment will not be exactly the same, but with this arrangement it is found that for any variation in the exterior diameter of the pipe within certain limits, the segments can be assembled with a minimum of clearance at the widest point, thus obviating the necessity of providing a series of sleeves of different sizes for each standard size of pipe which would otherwise be necessary. Moreover it has been found that with the inner faces of the segments curved as described, a more effective and reliable seal is obtained.

In the practical application of my invention, I have found that by making two sizes of sleeve in this manner for a particular standard size of pipe, all the variations from the extreme under size to extreme over size, exterior pipe diameters can be accommodated with a minimum of clearance in each case. For example, the exterior diameter of a standard 6″ cast iron pipe may vary from 6.800″ od (outside diameter) to 7.200″ od. Practically all cast iron pipe ordinarily used in gas or water distribution will fall within this range.

In carrying my invention into effect, I find it desirable for the best results to make my improved split sleeve in two sizes, which I will refer to as A and B, each of which is constructed as previously described. The smaller size split sleeve A will readily accommodate pipe variations from 6.800″ od to 6.900″ od, while the sleeve B of slightly larger segments will accommodate pipe variations from 7.100″ od to 7.200″ od. I also find that by combining one segment of the B or larger size sleeve, with two segments of the A or smaller size sleeve, a sleeve suitable for use with pipe varying from 6.900″ to 7.000″ od will be produced, while by combining one segment of the A sleeve with two segments of the slightly larger B sleeve, a sleeve suitable for use with pipe varying from 7.000″ od to 7.100″ od will be produced. Therefore, by forming the sleeves for any standard size in this manner, and in two sizes varying slightly from each other, and suitably combining the segments of said sleeves, a sleeve can be produced which will fit any piece of pipe the outside diameter of which lies between 6.800″ and 7.200″ without excessive clearance in any instance.

In actual practice, it has been found that the use of my invention in this manner practically solves the problem of excessive clearance and cold flowing of the rubber packing, and does away with both for all practical purposes.

Referring to the accompanying drawings,

Fig. 3 represents a section of the sleeve on the line 3—3 of Fig. 1.

Fig. 4 represents a similar section on the line 4—4 of Fig. 1.

Figure 1:
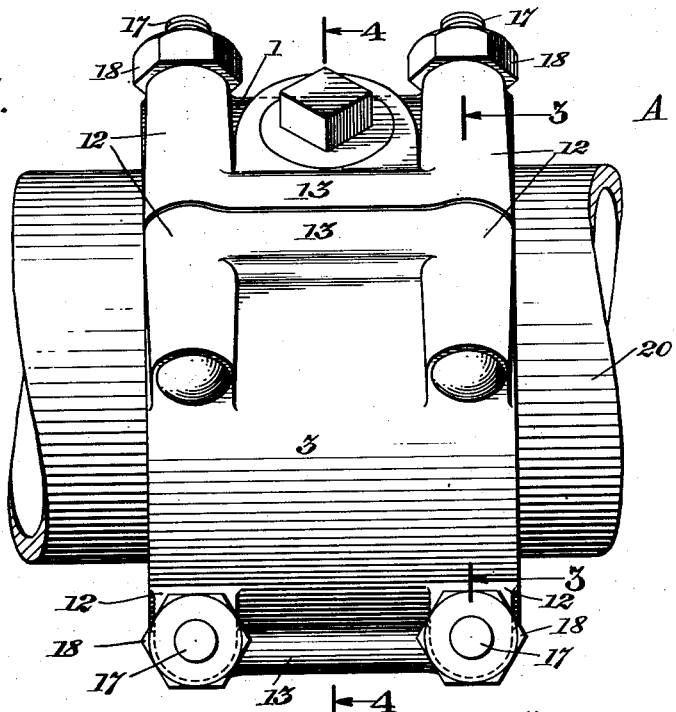
Fig. 1 is an elevation of a split sleeve embodying my invention applied to a pipe.
Figure 2:
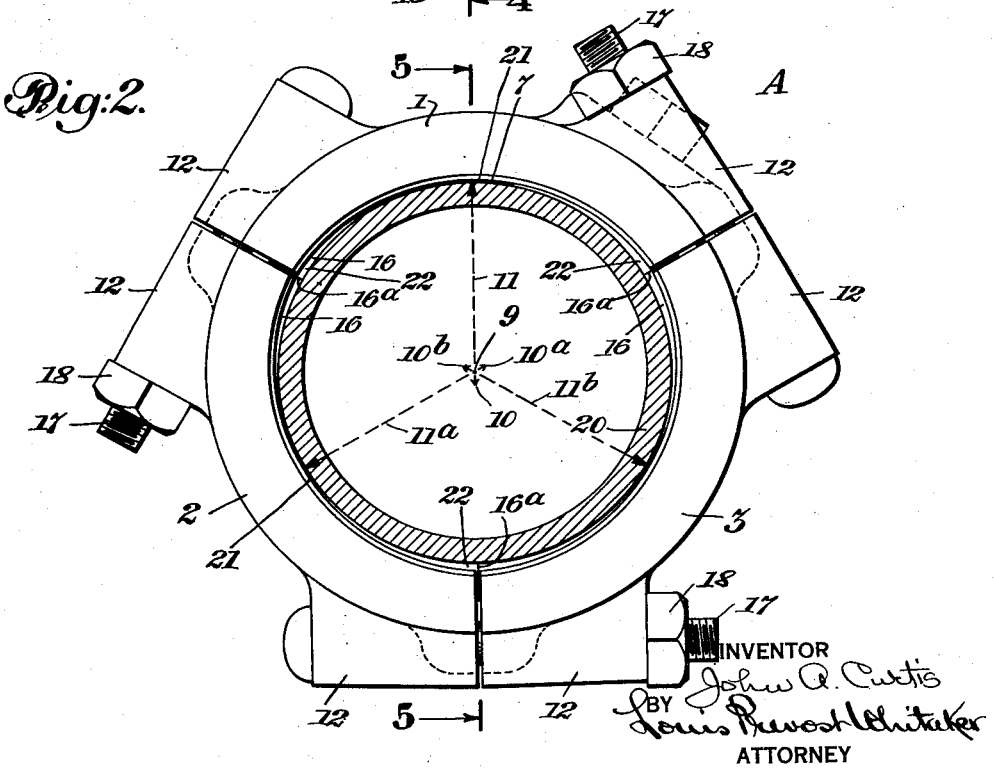
Fig. 2 represents an end elevation of the split sleeve showing the pipe in section.

As herein shown, the sleeves are formed of three segments, but I wish it understood that I may employ a larger number of segments, particularly in sleeves intended for use with pipes of large diameter, such as 24″ id, and larger, although I have found that in most instances the formation of the sleeve in three segments is satisfactory. Each of the segments 1, 2, and 3, of the sleeve, is of the same form, and a description of one will be sufficient for all. Each segment is provided at each end with inwardly extending integral flanges 4 and 5 forming between them a curved packing recess 6 of substantially rectangular cross section. The innermost portions of said flanges, indicated at 7 and 8 respectively (see Fig. 5) form portions of the pipe aperture. These portions 7 and 8 are preferably parallel to the outer surface of the pipe, but are of less width than the flanges 4 and 5, the inner faces of which adjacent to the portions 7 and 8 are slightly inclined outwardly to facilitate the casting of the segments. The exterior surface of each segment may be, and preferably is, curved concentrically to the theoretical axis of the sleeve, as indicated at 9 in the drawings, but the inner faces 7 and 8 of the flanges 4 and 5 are formed in an arc, the center of which, indicated at 10 in the drawings, is eccentric to and on the opposite side of the axis 9, and in the case of a 6″ pipe located approximately $\tfrac{1}{16}$″ therefrom, on a radius extending from the center of the segment through the theoretical axis 9 of the sleeve, and indicated in Fig. 2 by the dotted line 11. The foregoing applies to segment 1 and the other segments are similarly formed. Thus in segment 2 the curvature of the inner surfaces forming the pipe aperture are in an arc having its center at 10a, the radius being indicated by the dotted line 11a, while segment 3 having the inner surfaces of the portions forming part of the pipe aperture in an arc on the center 10b, on the radius indicated at 11b. I prefer also to make the inner curved surface 6a forming the bottom of each of the packing recesses coaxial with the theoretical axis 9 of the sleeve.

Figure 5:
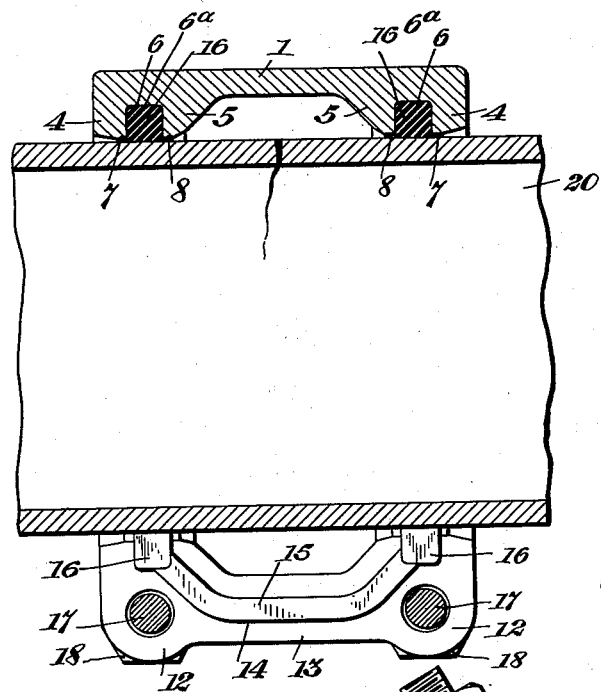
Fig. 5 represents a longitudinal section of the sleeve and pipe, on the line 5—5 of Fig. 2.

Each of the segments 1, 2 and 3 is provided adjacent to each end with bosses 12, 12, provided with bolt apertures, the axes of which are tangentially disposed with respect to the sleeve, said bosses being connected by an outwardly extending flange 13. The exterior face on one end of each flange 13 and the adjacent bosses 12 forming the end face of the segment is provided with a groove 14 extending from one of the end packing recesses to the other, as shown in Fig. 5, to receive a side packing of rubber or rubber composition to be engaged by the plane end face of the adjacent segment. I prefer to employ side packings, rectangular in cross section, as indicated at 15 in Fig. 4, in order to secure a larger body of rubber to be placed under pressure in uniting the segments of the sleeve, but in some instances sheet packings may be employed between the end faces of the segments if desired. Numerals 16, 16 represent the segments of the end packings which are placed in the recesses 6 of each segment between the inwardly extending flanges 4 and 5, and which are likewise of substantially rectangular form. Both the end packings 16 and the side packings 15 are made of greater width than the width of the recesses in which they are inserted, and are forced therein by hydraulic pressure or other suitable means so as to place them under considerable internal stress, and it will be understood that the segments of the sleeve will be delivered from the factory with the segments of the end packings and the side packings in their proper positions, and projecting slightly from their respective recesses. The segments of the end packings 16 will also be of slightly greater length than the segments so as to project slightly at the ends of the segments and come into contact, as indicated at 16a in Fig. 2 for example, and the ends of the side packings 15 will be recessed as shown in Fig. 5, to fit the portions of the end packings with which they come in contact, as indicated in said figure.

The sleeve segments are united by means of bolts 17, 17, and nuts 18, the said bolts passing through the bosses 12 of adjacent segments and lying approximately tangential with respect to the sleeve. When the sleeve segments are assembled (see Fig. 2 for example) it will be noted that the portions thereof which form the pipe aperture at each end of the sleeve and at opposite sides of each of the end packings, are not concentric with the center of the axis 9 of the sleeve, but are slightly eccentric thereto, each segment being curved on a longer axis than the true axis of the sleeve from one of the three centers 10, 10a, 10b, which are located on the opposite side of the theoretical center 9 from the segment.

The clearance between each segment of the sleeve and the exterior of the pipe or pipes 20 will be at the minimum adjacent to the central portion of each segment, as indicated at 21, and will increase slightly at the ends of each section, as indicated at 22. Nevertheless with this construction the sleeve can be efficiently used with pipes varying considerably in diameter. The sleeve illustrated in Figs. 1 to 5 inclusive represents a sleeve for a 6" standard size pipe, for example, which may vary from 6.800" od to 6.900" od, without danger of leakage. It will be seen that for a larger size than that shown in Fig. 2, for example, the segments will be separated a little more at their meeting ends when the end packings are fully compressed into sealing engagement with the pipe, with the result that the separate centers of the pipe aperture portions of the segments will be caused to approach more nearly to the theoretical center 9 of the sleeve. The only practical effect of this will be that the clearance between the pipe aperture portions of the sleeve and the exterior surface of the pipe will be more nearly uniform all the way around the pipe, but in actual practice the clearance will be so small that no appreciable cold flow of the end packings will result, and the side packings will accommodate the minute increased separation between the adjacent ends of the sleeve.

Figure 6:
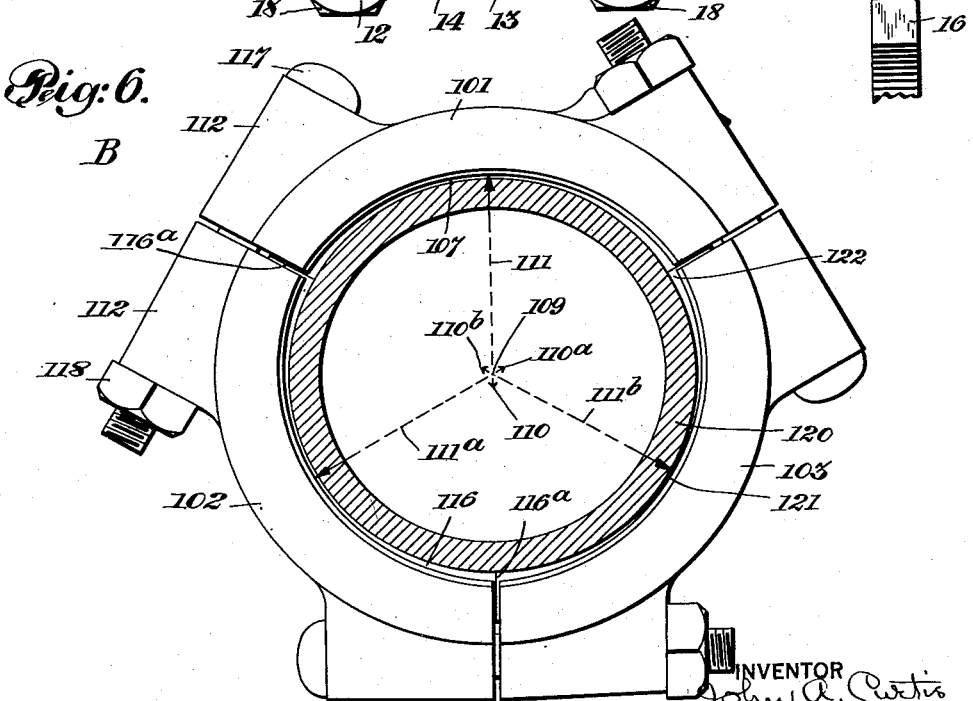
Fig. 6 represents a view similar to Fig. 2, showing a sleeve of the slightly larger size intended for the same standard pipe size as the sleeve shown in the other figures.

In Fig. 6 I have shown a sleeve constructed exactly like the sleeve shown in Figs. 1 to 5 except that it is sufficiently larger to accommodate variations of pipe diameter from 7.100" to 7.200" od. In this figure the parts are given the same reference numerals with the addition of 100, as the numerals in Figs. 1 to 5.

I have found in actual practice that by making for each standard size of pipe, two sizes of sleeve, such as the size indicated in Figs. 1 to 5, which I will term the A size sleeve, and the size indicated in Fig. 6, which I will term the B size sleeve, all variations of pipe which are encountered in practice for a standard size can be accommodated. Where the outside diameter of the pipe to which a repair sleeve is to be applied does not follow within the maximum and minimum dimensions for which the sleeves A and B respectively are constructed, intermediate variations in the outside diameter of the pipe can be readily accommodated by assembling one segment of an A sleeve with two segments of a B sleeve, or two segments of an A sleeve with one segment of a B sleeve, the bolt apertures in the bosses 12, which are necessarily slightly larger than the diameter of the bolts, readily accommodating these assemblages so that with two sizes of sleeve, all variations of outside pipe diameter likely to be encountered in the field for any standard size may be readily accommodated and the end packings will be brought into sealing engagement with the pipe for effecting a repair, or in some cases for effecting a union between the plain end pipes with the minimum of clearance, and practically doing away with danger of the sealing effect of the joint becoming impaired by cold flow of the end packings.

Figure 7:
Fig. 7 is a detail section view through one of the end packing segments before being compressed into its packing recess.

It will be understood that as the bolts are drawn up, the bolt strain does not have to be exerted to set up internal stress in the end packings, as they are already under a high state of internal stress, due to the fact that they were forced into the recesses of the sections by pressure at the factory, which recesses are considerably narrower than the original size of the packing, as will be readily understood from a comparison of the cross section of one of the end packings 16, shown in Fig. 7, with the compressed condition of the end packings indicated in Fig. 5. It follows, therefore, that as the bolts are drawn together, the force of the bolts, as the sleeve segments are drawn together, is mainly exerted in bringing the protruding portions of the end packing segments into sealing engagement with the pipe and merely has to place these slightly protruding portions under the same internal stress as the portions of the packings within the packing recesses without the necessity of increasing materially the internal stress of the enclosed portions of the packings. This greatly facilitates the effecting of a sealing engagement between the end packings and the exterior surface of the pipe without extensive movement of the sections with respect to each other as they are brought together. The same is true in regard to the side packings 15, which are likewise preferably under heavy internal stress within their packing recesses before the segments of the sleeve are assembled around the pipe.

While I have shown the sleeves A and B herein as being formed of three segments, which is my preferred construction, I wish it to be understood that the sleeves may be formed of any desired number of segments, as four or more if that is found desirable, especially in the case of pipes of large diameter above two foot internal diameter, for example. The construction of the individual segments will, however, be in accordance with the principles hereinbefore set forth, and the operation will be the same as that previously described.

It will also be understood that the feature of inserting the segments of the end packings in their respective recesses under high pressure previous to the assembly of the segments is also in some instances applicable to sleeves formed of two segments, and this is within the contemplation of my invention.

In the following claims where the term "rubber" is used, it will be understood that this term includes rubber and rubber compositions such as are ordinarily used for packing joints in pipe connections.

What I claim and desire to secure by Letters Patent is:

1. A repair device for pipe lines having a substantially cylindrical sleeve divided longitudinally into segments provided at each end with inwardly extending flanges forming a segmental portion of an annular packing recess between them, a packing ring composed of segments and of greater width than said recess forced under high pressure into the packing recesses of each sleeve segment prior to assembly, and held therein under internal stress, portions only of said packing ring segments projecting from said recess, clamping means for uniting said sleeve segments and compressing the projecting portions of the packing segments to substantially the same degree as the enclosed portions thereof, and side packings located between the meeting faces of said sleeve segments.

2. A repair device for pipe lines having a substantially cylindrical sleeve divided longitudinally into segments provided at each end with inwardly extending flanges forming a segmental portion of an annular packing recess between them, a packing ring composed of segments of greater width than said recess forced under high pressure into the packing recesses of each sleeve segment prior to assembly, and held therein under internal stress, one of the meeting faces of said segments being provided with a side packing recess for receiving a side packing to engage the other, clamping means for uniting said sleeve segments, and side packings forced under high pressure into said side packing recesses of said segments prior to assembly and held therein under internal stress, portions only of said end and side packings extending from their recesses and being compressed by said clamping means to substantially the same degree as the enclosed portions thereof.

3. A repair device for pipe lines comprising a substantially cylindrical sleeve divided longitudinally into three or more segments, each segment being provided at each end with inwardly extending flanges forming between them a segmental portion of an annular packing recess, the curvature of the inner faces of the segments being non-coaxial with the exterior surface of the pipe and being arcs of greater radius than the radius of the exterior surface of the pipe, to accommodate variations in exterior pipe diameter, one of the meeting faces of said segments being provided with a packing recess for receiving a side packing to engage the other, annular end packings of rubber comprising segments of greater width than said recess forced under high pressure into the packing recesses of each segment prior to assembly and held therein under internal stress, side packings forced under high pressure into said side packing recesses prior to assembly and held therein under internal stress, and clamping means for uniting adjacent ends of said sleeve segments, portions only of said end and side packings extending from their recesses, and compressed by said clamping means to substantially the same degree as the pre-compressed enclosed portions thereof.

4. A repair device for pipe lines comprising a substantially cylindrical sleeve divided longitudinally into three or more segments, each segment being provided at each end with inwardly extending flanges forming between them a segmental portion of an annular packing recess, the curvatures of the inner faces of the segments forming the pipe aperture of the sleeve being non-coaxial with the median axis of the sleeve and non-coaxial with each other, the axis of curvature of said inner faces of each segment being located beyond said median axis from the respective segment, end packings engaging the end packing recesses of said segments, clamping means for uniting said sleeve segments, and side packings located between the meeting faces of said sleeve segments.

5. A repair device for pipe lines comprising a substantially cylindrical sleeve divided longitudinally into three or more segments, each segment being provided at each end with inwardly extending flanges forming between them a segmental portion of an annular packing recess, the curvatures of the inner faces of the segments forming the pipe aperture of the sleeve being non-coaxial with the median axis of the sleeve and non-coaxial with each other, the axis of curvature of said inner faces of each segment being located beyond said median axis from the respective segment, the inner face of each segment having a radius of different length from that of another of said segments, end packings engaging the end packing recessess of said segments, clamping means for uniting said sleeve segments, and side packings located between the meeting faces of said sleeve segments.

6. A repair device for pipe lines comprising a substantially cylindrical sleeve divided longitudinally into three or more segments, each segment being provided at each end with inwardly extending flanges forming between them a segmental portion of an annular packing recess, the curvatures of the inner faces of the segments forming the pipe aperture of the sleeve being non-coaxial with the median axis of the sleeve and non-coaxial with each other, the axis of curvature of said inner faces of each segment being located beyond said median axis from the respective segment, end packings engaging the end packing recesses of said segments, clamping means for uniting said sleeve segments, and applying pressure to the projecting portions of the packings to substantially the same degree as the enclosed portions thereof, and side packings located between the meeting faces of said sleeve segments.

7. A repair device for pipe lines comprising a substantially cylindrical sleeve divided longitudinally into three or more segments, each segment being provided at each end with inwardly extending flanges forming between them a segmental portion of an annular packing recess, the curvatures of the inner faces of the segments forming the pipe aperture of the sleeve being non-coaxial with the median axis of the sleeve and non-coaxial with each other, the axis of curvature of said inner faces of each segment being located beyond said median axis from the respective segment while the curved surfaces forming the bottoms of said packing recess are coaxial with said median axis, clamping means for uniting said sleeve segments, and side packings located between the meeting faces of said sleeve segments.

JOHN A. CURTIS.